United States Patent [19]

Sasaki et al.

[11] Patent Number: 4,678,819

[45] Date of Patent: Jul. 7, 1987

[54] COMPOSITIONS FOR ARTIFICIAL MARBLES AND PROCESS FOR PRODUCING ARTIFICIAL MARBLES THEREFROM

[75] Inventors: Isao Sasaki, Hiroshima; Nobuhiro Mukai, Ohtake, both of Japan

[73] Assignee: Mitsubishi Rayon Co., Ltd., Tokyo, Japan

[21] Appl. No.: 767,433

[22] Filed: Aug. 20, 1985

[30] Foreign Application Priority Data

Aug. 30, 1984 [JP] Japan ............................ 59-181389
Aug. 31, 1984 [JP] Japan ............................ 59-182968

[51] Int. Cl.$^4$ ............................ C08K 7/14; C08K 3/00; C08K 9/04; C08K 9/00

[52] U.S. Cl. ............................ 523/171; 428/15; 523/200; 523/202; 523/203; 523/205; 523/209; 523/212; 523/214; 524/650; 524/730; 524/733; 524/779; 524/780; 524/781; 524/783; 524/784; 524/785; 524/786; 524/787; 524/788; 524/789; 524/790; 524/814; 524/817; 524/832; 524/833

[58] Field of Search ............ 523/200, 202, 203, 205, 523/171, 209, 212, 214; 524/733, 730, 650, 780, 790, 781, 779, 783, 784, 785, 786, 787, 788, 789, 814, 817, 832, 833; 428/15

[56] References Cited

U.S. PATENT DOCUMENTS

| 3,753,958 | 8/1973 | Wingler et al. | 524/533 |
|---|---|---|---|
| 3,775,364 | 11/1973 | Duggins | 524/425 |
| 3,847,865 | 11/1974 | Duggins | 524/437 |
| 4,183,991 | 1/1980 | Smiley et al. | 524/533 |
| 4,430,367 | 2/1984 | Lat | 523/171 |
| 4,435,540 | 3/1984 | Kishida et al. | 524/780 |
| 4,478,963 | 10/1984 | McGarry | 523/205 |
| 4,546,145 | 10/1985 | Kishida et al. | 524/780 |

FOREIGN PATENT DOCUMENTS

| 0074649 | 6/1977 | Japan | 523/205 |
|---|---|---|---|
| 0104621 | 9/1978 | Japan | 523/171 |
| 0016007 | 1/1982 | Japan | 523/202 |
| 0033308 | 2/1984 | Japan | 523/171 |
| 0217664 | 12/1984 | Japan | 523/171 |

*Primary Examiner*—Herbert J. Lilling
*Attorney, Agent, or Firm*—Oblon, Fisher, Spivak, McClelland & Maier

[57] ABSTRACT

A composition for artificial marble which comprises a polymer composition in which an inorganic substance and an organic polymer are firmly bound in one body and a vinyl compound, said polymer composition being obtained by polymerizing a polymerizable vinyl monomer, in the presence of at least one monomer selected from the group consisting of carboxylic acid monomer, sulfonic acid monomer, and sulfonate monomer, in an aqueous polymerization system containing an inorganic substance dispersed therein; and a processs for producing artificial marble from said composition by cast polymerization with the addition of a polymerization initiator.

19 Claims, No Drawings

COMPOSITIONS FOR ARTIFICIAL MARBLES AND PROCESS FOR PRODUCING ARTIFICIAL MARBLES THEREFROM

BACKGROUND OF THE INVENTION

1. Field of the Invention

The present invention relates to compositions for artificial marbles and a process for producing artificial marbles from said compositions. More particularly, this invention relates to compositions which can provide artificial marbles having superior mechanical properties and external appearances, and to a process for producing artificial marbles from the compositions by cast polymerization.

2. Description of the Prior Art

Conventionally, various kinds of the so-called artificial marble have been developed, in which methyl methacrylate (MMA) is blended with an inorganic filler comprising various inorganic substances such as aluminum hydroxide, alumina, calcium carbonate, etc. for the purpose of providing the artificial marble primarily with design effects, flame retardancy and rigidity. (See U.S. Pat. Nos. 3,775,364 and 3,847,865.)

In these conventional types of artificial marble, internal affinities such as miscibility, adhesion, etc. are poor due to substantial differences in properties between the inorganic filler and organic resin, so that the conventionally used inorganic filler has often exhibited no sufficient improving effect in relation to the mechanical properties of the artificial marble, particularly its bending strength and impact strength. In order to improve the foregoing shortcomings resulting from the use of the conventional types of inorganic filler, an artificial marble has been proposed, which is produced by surface-treating the inorganic filler with, for exmple, a silane coupling agent and then incorporating it in, for example, MMA resin, but no adequate improvement has recessarily been accomplished as yet. (See J. G. Marsuen, Appl. Polym. Symposia 14, pp. 108–109 (1970). UCC Technical Bulletin, F-43598A.)

SUMMARY OF THE INVENTION

The present invention has been made to solve the above-mentioned problems. Accordingly, it is an object of this invention to provide a composition for artificial marble which comprises a polymer composition (hereinafter referred to as organic substance-bound filler), in which an inorganic substance and an organic polymer are firmly bound in one body, and a vinyl compound, said polymer composition being obtained by polymerizing a polymerizable vinyl monomer in an aqueous polymerization system with an inorganic substance dispersed therein, as well as in the presence of at least one monomer selected from the group consisting of carboxylic acid monomer, sulfonic acid monomer, and sulfonate monomer, and a process for producing artificial marble characterized by cast polymerization of the composition with a polymerization initiator added thereto.

DETAILED DESCRIPTION OF THE PREFERRED EMBODIMENTS

Carboxylic acid monomers, sulfonic acid monomers and sufonate monomers are used for the formation of an organic substance-bound filler in the composition of the invention, the carboxylic acid monomer being represented by the following formulae (I) and (II), and the sulfonic acid monomer or the sulfonate monomer being represented by the following formula (III).

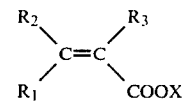

in which $R_1$ and $R_2$ are H, $C_1-C_{15}$ alkyl group, COOY (where Y is H, $NH_4$, or alkali metal atom), halogen atom, phenyl group, or substituted phenyl group; $R_3$ is H, $C_1-C_{15}$ alkyl group, halogen atom, phenyl group, or substituted phenyl group; and X is H, $NH_4$, or alkali metal atom;

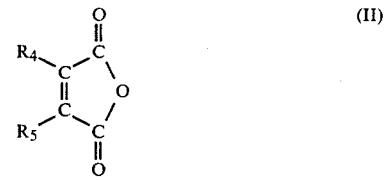

in which $R_4$ and $R_5$ are H, $C_1-C_{15}$ alkyl group, halogen atom, phenyl group, or substituted phenyl group;

in which $R'_1$ is H, $C_1-C_{20}$ alkyl group, phenyl group, substituted phenyl group, or halogen atom; X' is CONH,

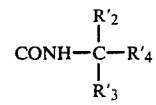

(where $R'_2$ and $R'_3$ are H or $C_1-C_{15}$ alkyl group, and $R'_4$ is a $C_1-C_{15}$ alkylene group), $COO(CH_2)_m$ (where m is an integer of 1 to 20), or $(CH_2)_n$ (where n is an integer of 0 to 20); and Y is H, $NH_4$, or alkali metal atom.

It is essential for the above-mentioned carboxylic acid monomer, which is represented by the above-mentioned formulae (I) and (II) and is used to form the organic substance-bound filler in the composition of this invention, to have one or more carboxyl groups as the active site for polymerization ano a double bond as the active site for firmly binding the resulting polymer and inorgainc substance. Such carboxylic acid monomer may be any of those compounds having these functional groups and includes acrylic acid, methacrylic acid, crotonic acid, tiglic acid, cinnamic acid, maleic anhydride, and citraconic anhydride, among which acrylic acid, methacrylic acid, and crotonic acid are most preferable because of their high polymerization activity.

It is also essential for the above-mentioned sulfonic acid monomer or sulfonate monomer, which has the above-mentioned formula (III) and is used to form the organic substance-bound filler in the composition of this invention, to have a sulfonic group as the active site for polymerization and a double bond as the active site for firmly binding the polymer and inorganic substance. Such sufonic acid monomer may be any of the compounds having these functional groups and includes 2-acrylamide-2-methylpropanesulfonic acid (AMPS)

trademark of The Lubrizol Corporation, sodium 2-methacryloyloxyethanesulfonate (SEM.Na), sodium 3-methacryloyloxypropanesulfonate (SPS), sodium 2-propenesulfonate (NaAs), and sodium 2-methyl-2-propenesulfonate (NaMS). Out of these, particularly AMPS including the amide bond, and SEM.Na and SPS both including the ester bond are desirable because they develop a remarkable secondary aggregation ability as well as an extremely high polymerization activity.

The inorganic substances used to form the organic substance-bound filler include simple substances of elements from Groups I, II, III, IV, and V of the Periodic Table, transition metals, and their oxides, hydroxides, chlorides, sulfates, sulfites, carbonates, phosphates, and silicates, and the mixtures and double salts thereof. Preferred among them are calcium sulfite, calcium sulfate, barium sulfate, silicon dioxide, quartz, calcite, feldspar, titanium oxdie, antimony trioxide, talc, clay, aluminum oxide, calcium carbonate, nickel powder, iron powder, zinc powder, copper powder, iron oxide, zinc oxide, aluminum hydroxide, magnesium hdyroxide, glass powder, glass beads, glass fiber, barium salt-or lead salt-containing glass filler, silica gel, zirconium oxide, tin oxide, and gypsum, since they are particularly outstanding in activating the vinyl monomer and assuring an effect of firm binding with the polymer.

According to the Invention, the inorganic substance may be added in an amount of 20 to 95 wt %, preferably 30 to 90 wt %, based on the total weight of the composition. Their shape and size may be properly selected.

The vinyl monomer used to form the organic substance-bound filler may be any vinyl monomer which is capable of radical polymerization. Methyl methacrylate is particularly preferred because it has high polymerization activity and its polymer has high affinity for the inorganic substance. Where a mixture of two or more kinds of vinyl monomers are used, at least one of them may preferably be methyl methacrylate and, more preferably, it may constitute a major component in the mixture. This is preferable because of its polymerization activity. Methyl methacrylate may be used in combination with styrene, substituted styrene, acrylonitrile, vinyl acetate, acrylic ester having a $C_1$–$C_{20}$ alkyl group, and methacrylic ester having a $C_2$–$C_{20}$ alkyl group.

The organic substance-bound filler is obtainable by polymerizing one or more of carboxylic acid monomer, sulfonic acid monomer and sulfonate monomer and one or more of polymerizable vinyl monomers in a polymerization system with an inorganic substance dispersed therein. In other words, it is essential that the polymerization be effected in the presence of an inorganic substance.

One example of a preferred process of producing said organic substance-bound filler may represent a method of causing heterogeneous polymerization in an aqueous system and thus effecting polymerization during certain predetermined hours by suspending and dispersing said vinyl monomer and said inorganic substance in an aqueous medium at temperatures in such a range that no thermal polymerization takes place and then by adding and stirring one or more of carboxylic acid monomer, sulfonic acid monomer and sulfonate monomer.

For the formation of the organic substance-bound filler, the carboxylic acid monomer, sulfonic acid monomer or sulfonate monomer may be used in an amount of about 0.05 to 100 wt %, preferably 0.1 to 50 wt %, more preferably 0.5 to 30 wt %, based on the total weight of the inorganic substance and vinyl monomer. In most cases, it is preferred to increase the amount of carboxylic acid monomer, sulfonic acid monomer or sulfonate monomer in correspondence with an increase in the vinyl monomer component. The weight ratio of the inorganic substance to the vinyl monomer or monomers may be varied in a wide range, for example, from about 500:1 to about 1:5, preferably from 250:1 to 1:5, and more preferably about 50:1 to about 1:1.

The amount of water as the reaction medium may be about 1 wt % to hundredsfold, preferably about 10 wt % to tensfold, based on the total weight of the inorganic substance and vinyl monomer. The polymerization reaction may preferably be effected under an inert gas such as nitrogen at about 10 to 100° C., preferably 20° to 80° C., for 30 minutes to about 15 hours. The organic substance-bound filler thus formed may be dried at about 10° to 300° C., preferably about 50° to 200° C.

The interaction between the inorganic substance and the polymer in the organic substance-bound filler is more than a simple adsorption or physical bonding caused by the van der Waals force. This is evidenced by the fact that only a small amount of polymer can be dissolved when the organic substance-bound filler is subjected to extraction with a hot benzene which is a good solvent for vinyl polymers. The firm binding effect between the inorganic substance and the polymer in the organic substance-bound filler is not achieved if the inorganic substance is coated by solution method with a separately produced polymer which is considered to be identical to that polymerized in the presence of the inorganic substance. This is apparent from the fact that most part of the polymer is dissolved when the organic filler obtained by solution method is similarly subjected to extraction.

In the organic substance-bound filler, the amount of the polymer that is chemically bound to the inorganic substance may be 0.01 to 100 wt %, preferably 0.05 to 50 wt %, more preferably 0.1 to 30 wt %. With less than 0.01 wt % of the polymer, the organic substance-bound filler is poor in mechnical properties; and with more than 100 wt %, the organic substance-bound filler is extremely high in oil absorption, so that the composition will be of low flowability, thus resulting in difficulty in handling.

In the composition of this invention, a vinyl compound to be incorporated with the above mentioned organic-substance bound filler may be methyl methacrylate or a mixture of methyl methacrylate in a major amount and copolymerizable monomer in a minor amount, or a partial polymer thereof (hereinafter referred to as methacrylate syrup). The copolymerizable monomer is a monofunctional vinyl compound such as styrene; acrylonitrile; vinyl acetate; methyl acrylate; ethyl acrylate and methacrylate; butyl acrylate and methacrylate; 2-ethylhexylacrylate and methacrylate; lauryl acrylate and methacrylate; stearyl acrylate and methacrylate; hydroxyethyl acrylate and methacrylate; methoxyethyl acrylate and methacrylate; glycidyl acrylate and methacrylate; and methacryloyloxyethyl trimellitate and acid anhydride thereof.

In the composition of this invention, optionally a multifunctional vinyl compound may additionally be used. It is represented, for example, by the following formula (IV):

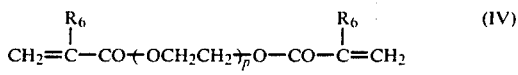

(where $R_6$ is H or methyl group, and p is an integer of 1 to 20), and includes ethylene glycol diacrylate and dimethacrylate; diethylene glycol diacrylate and dimethacrylate; triethylene glycol diacrylate and dimethacrylate; and polyethylene glycol diacrylate and dimethacrylate. These acrylates and methacrylates may be used alone or in combination. Moreover, it is also possible to add a liquid polybutadiene.

The monofunctional vinyl compound may be used in an amount of 20 wt % or less based on the amount of methyl methacrylate, and the multifunctional vinyl compound may be used in an amount of 0.01 to 10 wt % based on the total amount of the vinyl compound used in polymerization. The methacrylate syrup used may contain 95 to 2 wt % of the polymer, preferably 85 to 15 wt % of the polymer.

The composition of this invention may preferably be incorporated with at least one of silane, titanate, aluminate, and zircoaluminate coupling agents in order to reduce the viscosity. The amount of the coupling agent may be 0.01 to 10 wt % based on the total amount of the composition.

The composition of this invention may optionally be incorporated with a coloring matter, polymerization inhibitor, ultraviolet absorber, antioxidant, etc.

The composition for artificial marble of this invention which comprises said organic substance-bound filler and vinyl compound is converted, by cast polymerization, into a cured molding to be used as artificial marble. According to this process, a uniform dispersion and stabilization of the filler in the composition, which has been very difficult to attain in the conventional technique, is obtained, and the cured molding may also exhibit its outstanding properties. The organic substance-bound filler may be mixed with a methacrylate resin and the resulting mixture may be made into a molded product by pressure molding with heat-melting. The product thus obtained, however, is inferior in terms of mechanical strength to the product obtained by cast molding.

In order to obtain a desired cured molding using the composition of this invention a polymerization catalyst that polymerizes the vinyl compound in the composition is used. Although any of the known polymerization catalysts can be used, when the polymerization is effected by heating, the polymerization catalyst which may be used is a substance which initiates polymerization upon decomposition at a high temperature and includes, for example, benzoyl peroxide, cumene hydroperoxide, t-butyl hydroperoxide, dicumyl peroxide, acetyl peroxide, lauroyl peroxide, and azobisisobutyronitrile, and when the polymerization is effected at normal temperatures, the polymerization catalyst which may be used is a combination of a peroxide and amine, a peroxide and sulfinic acid, or a peroxide and cobalt compound.

In addition, the composition of this invention may be incorporated further with a photosensitizer such as benzoin methyl ether, benzoin ethyl ether, and benzoin propyl ether, so that it can be cured by irradition of ultraviolet light.

For the cast polymerization of the composition of this invention, the polymerization initiator may be used in an amount of 0.01 to 10 wt % based on the amount of the vinyl compound. The cast polymerization is effected by heating the composition at 50° to 80° C. for 1 to 5 hours and further heating it at 100° to 140° C. for 0.5 to 3 hours.

The composition for artificial marble of this invention contains as the filler the organic substance-bound filler in which an inorganic compound and an organic polymer are firmly bound in one body; therefore, the affinity at interfacial boundary between the filler and the vinyl compound is greatly improved, with the result that the filler is dispersed uniformly and stably in the composition and that the workability of the composition is greatly improved. Upon curing, the composition can provide the artificial marble of superior mechanical properties and external appearances which has not been obtained using the conventional material for artificial marble.

According to this invention, any inorganic substance that cannot effectively be treated with a common coupling agent can be used as an inorganic substance for the organic substance-bound filler.

The invention will be described in more detail with reference to the following Examples, in which amounts are to be understood as parts by weight. The mechanical strengths of the cured product were evaluated by measuring the bending strength and Izod impact strength according to JIS K6911.

EXAMPLES 1 and 2 and COMPARATIVE EXAMPLES 1 and 2

In a 5-liter four-mouth flask equipped with a condenser, nitrogen introduction tube, stirrer, and thermocouple was placed 4,000 ml of demineralized water. In this water was dispersed and suspended 1,200 g of aluminum hydroxide powder (Hydilite H-210, a trademark of Showa Light Metal Co., Ltd.) as an inorganic substance. The flask was purged with nitrogen for 30 minutes. Then, 215 g of methyl methacrylate as a vinyl monomer was added with vigorous stirring under a nitrogen stream. The contents of the flask were heated to 60° C. in a water bath. After methyl methacrylate had uniformly been dispersed, a solution of 57 g of methacrylic acid as a carboxylic acid monomer in 100 ml of demineralized water was slowly added, and the polymerization reaction was effected at 60° C. for 8 hours.

After the completion of the polymerization reaction, the reaction product was filtered off under reduced pressure, washed thoroughly with demineralized water, and dried at 105° C. with a steam drier, to yield 1370 g of an organic substance-bound filler. The polymer content of the organic substance-bound filler was measured by calcination and was 12%, while the polymer content of the organic substance-bound filler after extraction with hot benzene for 50 hours by a Soxhlet extractor was 10%. This indicates that the aluminum hydroxide powder and most of the polymer formed on the powder surface by the polymerization reaction are firmly bound in one body.

The organic substance-bound filler thus obtained was mixed with methacrylate syrup (rate of polymerization=33.4%, intrinsic viscosity of polymer=0.033 l/g, viscosity at 23° C. =680 cp) and azobisisobutyronitrile in the ratio as indicated in Table 1 (Example 1). The mixture was mechanically mixed to prepare a dope for cast polymerization.

In Example 2, 1 wt % of 3methacryloyloxypropyltrimethoxysilane (coupling agent) was added to the organic substance-bound filler to lower the viscosity of the dope.

Each dope prepared in Examples 1 and 2 was cast into a mold formed of tempered glass applied with a polyethylene terephthalate film and gasket. The dope was then cured at 65° C. for 3 hours in a water bath and further at 130° C. for 2 hours in an oven. The bending strength and Izod impact strength of the cured product were measured. The results are shown in Table 1.

In Comparative Example 1, the organic substance-bound filler used in Examples 1 and 2 was replaced by the aluminum hydroxide powder which have been used for the preparation of that filler, and in Comparative Example 2, the aluminum hydroxide powder and the same silane coupling agent as in Example 2 were used for the preparation of a dope.

The amount used of the filler in comparative Example 1 was made to correspond to the content of the aluminum hydroxide powder in the organic substance-bound filler in Example 1, that is, 409 parts×0.88=360 parts. On the other hand, the amount used of the methacrylate syrup in Comparative Example 1 was made greater than that in Example 1, by the amount corresponding to the amount of the polymer in the above-mentioned organic substance-bound filler, that is, 409 parts−360 parts=49 parts. In Example 2 and Comparative Example 2, on the basis of the similar calculations, the amounts of the filler and the methacrylate syrup were determined.

Each dope prepared in Comparative Examples 1 and 2 was cast and cured in the same manner as in Example 1, and the bending strength and Izod impact strength of the cured product were measured. The results are shown in Table 1.

It will be noted from Table 1 that the dope incorporated with the organic substance-bound filler according to Examples of the present invention can provide the cured products for artificial marble having mechanical properties superior to those provided by the dopes of Comparative Examples incorporated with untreated filler. Because of excellent wettability to the liquid resin, the organic substance-bound filler is readily intimately mixed with the resin to form the artificial marble having much better external appearances than with Comparative Examples.

TABLE 1

| No. | Filler | Amount used of filler (parts) | Methacrylate syrup (parts) | Azobisisobutyronitrile (parts) | bending strength (Kg/cm$^2$) | Izod impact strength (Kg-cm/cm$^2$) |
|---|---|---|---|---|---|---|
| Example 1 | organic substance bound filler | 409 | 191 | 0.19 | 850 | 7.0 |
| Example 2 | organic substance-bound filler (with silane coupling agent added) | 409 | 191 | 0.19 | 900 | 7.5 |
| Comparative Example 1 | Aluminum hydroxide powder | 360 | 240 | 0.24 | 600 | 3.5 |
| Comparative Example 2 | Aluminum hydroxide powder (with silane coupling agent added) | 360 | 240 | 0.24 | 610 | 4.0 |

EXAMPLES 3 and 4 COMPARATIVE EXAMPLES 3 and 4

The heterogeneous polymerization in an aqueous system was carried out in the same manner as in Example 1, except that 1,200 g of quartz powders (Crystalite A-2, a trademark of Tatsumori Co., LTD.) was used as the inorganic substance, to obtain 1,333 g of the organic substance-bound filler containing 10% of a polymer. The polymer content of this filler after extraction with a hot benzene for 50 hours by a Soxhlet extractor was 9%. The dopes of Examples 3 and 4 and Comparative Examples 3 and 4 were prepared by compounding the filler of the quartz powders with the methacrylate syrup and azobisisobutyronitrile according to the formulation shown in Table 2. The dopes were cast and cured in the same manner as in Example 1. The mechanical properties of the cured products were measured, the results being shown in Table 2. It can be seen from Table 2 that each dope prepared in Comparative Examples 3 and 4 provides the cured product having strength properties considerably lower than with each dope prepared in Examples 3 and 4. That is, the organic substance-bound filler in these Examples effectively improves the mechanical properties of artificial marble. Because of excellent wettability to the liquid resin, the organic substance-bound filler is readily intimately mixed with the resin to form the artificial marble having much better external appearances than with the Comparative Examples.

TABLE 2

| No. | Filler | Amount used of filler (parts) | Methacrylate syrup (parts) | Azobisisobutyronitrile (parts) | bending strength (Kg/cm$^2$) | Izod impact strength (kg-cm/cm$^2$) |
|---|---|---|---|---|---|---|
| Example 3 | organic substance-bound filler | 400 | 200 | 0.20 | 1,150 | 7.5 |
| Example 4 | organic substance-bound filler (with silane coupling agent added) | 400 | 200 | 0.20 | 1,250 | 8.0 |
| Comparative Example 3 | quartz powder | 360 | 240 | 0.24 | 730 | 3.5 |
| Comparative Example 4 | quartz powder (blended with silane | 360 | 240 | 0.24 | 800 | 4.8 |

TABLE 2-continued

| No. | Filler | Composition of dope | | | Mechanical properties of cured product | |
|---|---|---|---|---|---|---|
| | | Amount used of filler (parts) | Methacrylate syrup (parts) | Azobisiso-butyronitrile (parts) | bending strength (Kg/cm$^2$) | Izod impact strength (kg-cm/cm$^2$) |
| | coupling agent added) | | | | | |

EXAMPLE 5 and COMPARATIVE EXAMPLES 5 and 6

The heterogeneous polymerization in an aqueous system was carried out in the same manner as in Example 1, except that 1,200 g of magnesium hydroxide powders (special grade chemical) was used as the inorganic substance, to obtain 1,412 g of organic substance-bound filler containing 15% of a polymer. The polymer content of this filler after extraction with a hot benzene for 50 hours by a Soxhlet extractor was 13%. The dopes of Example 5 and Comparative Examples 5 and 6 were prepared by compounding the organic substance-bound filler or the magnesium hyroxide powders with the methacrylate syrup and azobisisobutyronitrile according to the formulation shown in Table 3. The dopes were cast and cured in the same manner as in Example 1. The mechanical properties of the cured products were measured. The results are shown in Table 3.

It will be noted from Table 3 that the dopes of Comparative Examples 5 and 6 where the magnesium hydroxide powders are used as the filler provide the cured products having a considerably low level of strengths as compared with those of Examples 5. That is, the organic substance-bound filler in Example 5 effectively improves the mechanical properties of artificial marble. Because of its good wettability to the liquid resin, the organic substance-bound filler is readily intimately mixed with the resin to form artificial marble having much better external appearances than with the Comparative Examples.

merization initiator. The resulting copolymer (49 g) was dissolved in 191 g of the methacrylate syrup (the methacrylate syrup is the same as used in Example 1). The copolymer-containing methacrylate syrup (240 g) was used to prepare a dope and the dope was cured in the same manner as in Comparative Example 2. The mechanical properties of the cured product were measured, the results being shown in Table 4.

It will be noted from Table 4 that the cured product in Comparative Example 7 is inferior in strength to that in Example 2. In addition, because of poor wettability, the filler does not uniformly disperse but precipitates, resulting in a strikingly bad appearance of the cured product.

TABLE 4

| No. | Filler | Composition of dope | | | Mechanical properties of cured product | |
|---|---|---|---|---|---|---|
| | | Amount used of filler (parts) | Copolymer-incorporated methacrylate syrup (parts) | Azobisiso-butyronitrile (parts) | bending strength (Kg/cm$^2$) | Izod impact strength (Kg-cm/cm$^2$) |
| Comparative Example 7 | Aluminum hydroxide powder (with silane coupling agent added) | 360 | 240 | 0.24 | 578 | 3.1 |

REFERENTIAL EXAMPLE 1

The organic substance-bound filler obtained in Example 1 was mixed with a pearl-like methyl methacrylate resin, and the resulting mixture was subjected to pressure molding by heat-melting. The mechanical strength of the resulting product was measured in the same manner as in Example 1. The results are shown in Table 5.

It will be noted from Table 5 that the molded product obtained by pressure molding is superior in mechanical strength to those obtained in Comparative Examples; but it is still inferior to that obtained by cast polymerization. That is, the composition of this invention is suitable for molding by cast polymerization.

TABLE 3

| No. | Filler | Composition of dope | | | Mechanical properties of cured product | |
|---|---|---|---|---|---|---|
| | | Amount used of filler (parts) | Methacrylate syrup (parts) | Azobisiso-butyronitrile (parts) | bending strength (Kg/cm$^2$) | Izod impact strength (Kg-cm/cm$^2$) |
| Example 5 | organic substance-bound filler | 424 | 176 | 0.18 | 770 | 5.6 |
| Comparative Example 5 | Magnesium hydroxide powder | 360 | 240 | 0.24 | 550 | 3.0 |
| Comparative Exmaple 6 | Magnesium hydroxide powder (with silane coupling agent added) | 360 | 240 | 0.24 | 580 | 3.2 |

COMPARATIVE EXAMPLE 7

50 g of methyl methacrylate and 13 g of methacrylic acid were compolymerized by bulk polymerization in the presence of 0.6 g of azobisisobutyronitrile as a poly-

TABLE 5

| No. | Molding method | Mechanical strengths | |
|---|---|---|---|
| | | bending strength (Kg/cm$^2$) | Izod impact strength (Kg-cm/cm$^2$) |
| Referential Example 1 | Press molding | 800 | 6.5 |

TABLE 5-continued

| No. | Molding method | Mechanical strengths | |
|---|---|---|---|
| | | bending strength (Kg/cm$^2$) | Izod impact strength (Kg-cm/cm$^2$) |
| Example 1 | Cast molding | 850 | 7.0 |

EXAMPLES 6 and 7

Into a 5-liter four-mouth flask equipped with a condenser, nitrogen introduction tube, stirrer, and thermocouple was charged 4,000 ml of demineralized water. In this water was dispersed and suspended 1,200 g of aluminum hydroxide powders (Hydilite H-210, a trademark of Showa Light Metal Co., Ltd.) as an inorganic substance. The flask was purged using nitrogen for 30 minutes. Then, 215 g of methyl methacrylate as a vinyl monomer was added with vigorous stirring under a nitrogen stream. The contents of the flask were heated to 60° C. in a water bath. After methyl methacrylate had been uniformly dispersed, a solution of 57 g of SEM.Na as a sulfonate monomer in 100 ml of demineralized water was slowly added, and polymerization reaction was effected at 60° C. for 8 hours.

After the completion of the polymerization reaction, the reaction product was filtered off under reduced pressure, washed thoroughly with demineralized water, and dried at 105° C. in a steam drier, to give 1,310 g of organic substance-bound filler. Upon calcination, this filler was found to contain 8% of a polymer. The polymer content of this filler was 7% even after extraction with a hot benzene for 50 hours by a Soxhlet extractor. This indicates that aluminum hydroxide powder and most of the polymer formed on the surface of the powder by the polymerization reaction are firmly bound in one body.

The organic substance-bound filler thus obtained was mixed with methacrylate syrup (rate of polymerization =33.4%, intrinsic viscosity of polymer =0.033 l/g, viscosity at 23° C.=680 cp) and azobisisobutyronitrile in the ratio as indicated in Table 6 (Example 6). The mixture was mechanically mixed to prepare a dope for cast polymerization.

In Example 7, 1 wt % of 3-methacryloxypropyltrimethoxysilane (coupling agent) was added to the organic substance-bound filler to lower the viscosity of the dope.

Each dope prepared in Examples 6 and 7 were cast into a mold formed of tempered glass applied with a polyethyleneterephthalate film and gasket. The dope was cured at 65° C. for 3 hours in a water bath and further at 130° C. for 2 hours in an oven. The bending strength and Izod impact strength of the cured product were measured, the results being shown in Table 6.

It will be noted from Table 6 that the cured artificial marbles in Examples 6 and 7 are superior in mechanical properties. Because of its good wettability to the liquid resin, the organic substance-bound filler is readily intimately mixed with the resin to form the artificial marble having excellent external appearance.

TABLE 6

| No. | Composition of dope | | | | Mechanical properties of cured product | |
|---|---|---|---|---|---|---|
| | Filler | Amount used of filler (parts) | Methacrylate syrup (parts) | Azobisiso- butyronitrile (parts) | bending strength (Kg/cm$^2$) | Izod impact strength (Kg-cm/cm$^2$) |
| Example 6 | organic substance-bound filler | 391 | 209 | 0.21 | 840 | 7.1 |
| Example 7 | organic substance-bound filler (with silane coupling agent added) | 391 | 209 | 0.21 | 890 | 7.4 |

EXAMPLES 8 and 9

The heterogeneous polymerization in an aqueous system was carried out in the same manner as in Example 6, except that 1,200 g of quartz powder (Crystalite A-2, a trademark of Tatsumori Co., Ltd.) was used as the inorganic substance, to obtain 1,328 g of organic substance-bound filler containing 9% of a polymer. The polymer content of this filler after extraction with a hot benzene for 50 hours by a Soxhlet extractor was 8%. The dopes of Examples 8 and 9 were prepared by compounding the organic substance-bound filler or quartz powders with a methacrylate syrup and azobisisobutyronitrile according to the formulation shown in Table 7. The dopes were cast and cured in the same manner as in Example 6. The mechanical properties of the cured products were measured, the results being shown in Table 7.

It will be noted from Table 7 that the cured products in Examples 8 and 9 are superior in strength. That is, the organic substance-bound filler prepared in Examples 8 and 9 effectively improves the mechanical properties of artificial marble. Because of its good wettability to the liquid resin, the substance-bound filler is readily intimately mixed with the resin to form the artificial marble having excellent external appearance.

TABLE 7

| No. | Composition of dope | | | | Mechanical properties of cured product | |
|---|---|---|---|---|---|---|
| | Filler | Amount used of filler (parts) | Methacrylate syrup (parts) | Azobisiso- butyronitrile (parts) | bending strength (Kg/cm$^2$) | Izod impact strength (Kg-cm/cm$^2$) |
| Example 8 | organic substance-bound filler | 396 | 204 | 0.20 | 1,100 | 7.0 |
| Example 9 | organic substance-bound filler (with silane coupling agent added) | 396 | 204 | 0.20 | 1,200 | 7.5 |

EXAMPLE 10

The heterogeneous polymerization in an aqueous system was effected in the same manner as in Example 6, except that 1,200 g of magnesium hydroxide powders (special grade chemical) was used as the inorganic substance, to obtain 1,400 g of organic substance-bound filler containing 14% of a polymer. The polymer content of this filler after extraction with a hot benzene for 50 hours by a Soxhlet extractor was still 12%. A dope was prepared by compounding the organic substance-bound filler with a methacrylate syrup and azobisisobutyronitrile according to the formulation shown in Table 8. The dope was cast and cured in the same manner as in Example 6. The mechanical properties of the cured product were measured. The results are shown in Table 8.

It will be noted from Table 8 that the composition of this invention provides artificial marble superior in mechanical properties. Because of its good wettability to the liquid resin, the organic substance-bound filler used in the present invention is readily intimately mixed with the resin to form the artificial marble having excellent external appearance.

REFERENTIAL EXAMPLE 2

The organic substance-bound filler obtained in Example 6 was mixed with a pearl-like methyl methacrylate resin, and the resulting mixture was subjected to pressure molding by heat-melting. The mechanical strength of the resulting product was measured in the same way as in Example 1. The results are shown in Table 10.

It will be noted from Table 10 that the molded product obtained by pressure molding is inferior to that obtained by cast polymerization. This indicates that the composition of this invention is more suitable for molding by cast polymerization.

TABLE 10

| | | Mechanical strengths | |
|---|---|---|---|
| No. | Molding method | bending strength ($Kg/cm^2$) | Izod impact strength ($Kg-cm/cm^2$) |
| Referential Example 2 | Press molding | 790 | 6.4 |
| Example 6 | Cast molding | 840 | 7.1 |

EXAMPLES 11–18

TABLE 8

| | | Composition of dope | | | Mechanical properties of cured product | |
|---|---|---|---|---|---|---|
| No. | Filler | Amount used of filler (parts) | Methacrylate syrup (parts) | Azobisiso-butyronitrile (parts) | bending strength ($Kg/cm^2$) | Izod impact strength ($Kg-cm/cm^2$) |
| Example 10 | organic substance-bound filler | 419 | 181 | 0.18 | 760 | 5.5 |

COMPARATIVE EXAMPLE 8

50 g of methyl methacrylate and 13 g of SEM.Na were copolymerized by bulk polymerization in the presence of 0.6 g of azobisisobutyronitrile as a polymerization initiator. The resulting copolymer (49 g) was dissolved in 191 g of a methacrylate syrup as in Example 2. The copolymer-containing methacrylate syrup (240 g) was compounded into a dope and the dope was cured in the same manner as in Comparative Example 2. The mechanical properties of the cured product were measured, the results being shown in Table 9.

It can be seen from Table 9 that the cured product in Comparative Example 8 is inferior in strength to that in Example 7. In addition, because of its poor wettability, the filler does not uniformly disperse but precipitates, resulting in the artificial marble having a poor external appearance.

The same procedure as in Example 1 was repeated to prepare the organic substance-bound fillers but using, as a carboxylic acid monomer, acrylic acid, maleic anhydride, 2-acrylamide-2-methylpropane sulfonic acid (AMPS) and a mixed monomer of methacrylic acid and AMPS (50:50 by weight), respectively, in place of methacrylic acid. The cured products prepared by cast polymerization of the mixtures of the fillers prepared above and the same methacrylate syrup as used in Example 1, were evaluated for the bending strength and Izod impact strength, the results being given in Table 11.

Table 11 indicates that the organic substance-bound fillers according to the present Examples can provide the cure products having the excellent mechanical properties. In addition, the fillers prepared in accordance with the Examples have excellent wettability to the liquid resin, so that they are readily intimately mixed with the resin and the cured test pieces prepared had the strikingly good external appearances.

TABLE 9

| | | Composition of dope | | | Mechanical properties of cured product | |
|---|---|---|---|---|---|---|
| No. | Filler | Amount used of filler (parts) | Copolymer-incorporated methacrylate syrup (parts) | Azobisiso-butyronitrile (parts) | bending strength ($Kg/cm^2$) | Izod impact strength ($Kg-cm/cm^2$) |
| Comparative Example 8 | Aluminum hydroxide powder (with coupling agent added) | 360 | 240 | 0.24 | 570 | 3.0 |

TABLE 11

| Example No. | Carboxylic acid monomer used in preparation of filler (filler used with or without silane coupling agent added*) | Composition of dope | | | Mechanical properties of cured product | |
|---|---|---|---|---|---|---|
| | | Amount used of filler (parts) | Methacrylate syrup (parts) | Azobisisobutyronitrile (parts) | Bending strength (Kg/cm²) | Izod impact strength (Kg-cm/cm²) |
| 11 | Acrylic acid | 409 | 191 | 0.19 | 840 | 6.8 |
| 12 | Acrylic acid (with silane coupling agent added) | 409 | 191 | 0.19 | 890 | 7.2 |
| 13 | Maleic anhydride | 400 | 200 | 0.20 | 835 | 6.9 |
| 14 | maleic anhydride (with silane coupling agent added) | 400 | 200 | 0.20 | 898 | 7.4 |
| 15 | AMPS | 410 | 190 | 0.19 | 852 | 7.1 |
| 16 | AMPS (with silane coupling agent added) | 410 | 190 | 0.19 | 905 | 7.7 |
| 17 | Methacrylic acid/AMPS (50/50) | 412 | 188 | 0.19 | 850 | 7.0 |
| 18 | Methacrylic acid/AMPS (50/50) (with silane coupling agent added) | 412 | 188 | 0.19 | 900 | 7.5 |

*Silane coupling agent is the same and in the same amount as used in Example 2

What is claimed is:

1. A composition for artificial marble which comprises a polymer composition, in which an inorganic substance and an organic polymer are firmly bound in one body, and a vinyl compound comprising methyl methacrylate, said polymer composition being obtained by heterogeneously polymerizing methyl methacrylate or a mixture of methyl methacrylate and other vinyl monomer susceptible to radical polymerization, in the presence of at least one monomer selected from the group consisting of carboxylic acid monomers represented by the general formula (I):

wherein $R_1$ and $R_2$ are H, $C_1-C_{15}$ alkyl group, COOY where Y is H, $NH_4$, or alkali metal atom, halogen atom, phenyl group, or substituted phenyl group; $R_3$ is H, $C_1-C_{15}$ alkyl group, halogen atom, phenyl group, or substituted phenyl group; and X is H, $NH_4$, or alkali metal atom, or by the general formula (II):

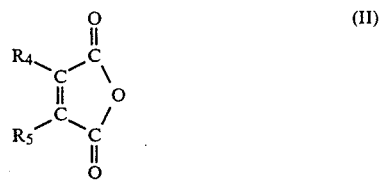

wherein $R_4$ and $R_5$ are H, $C_1-C_{15}$ alkyl group, halogen atom, phenyl group, or substituted phenyl group, and sulfonic acid monomers or sulfonate monomers represented by the general formula (III):

wherein $R'_1$ is H, $C_1-C_{20}$ alkyl group, phenyl group, substituted phenyl group, or halogen atom; X' is CONH,

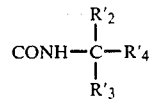

where $R'_2$ and $R'_3$ are H or $C_1-C_{15}$ alkyl group, and $R'_4$ is $C_1-C_{15}$ alkylene group, $COO(CH_2)_m$ where m is an integer of 1 to 20, or $(CH_2)_n$ where n is an integer of 0 to 20; and Y is H, $NH_4$, or alkali metal atom, in an aqueous polymerization system containing the inorganic substance dispersed therein, said composition further comprising at least one of silane, titanate, aluminate and zircoaluminate coupling agents in an amount of 0.01 to 10 wt. % based on the total weight of the composition.

2. A composition as claimed in claim 1, wherein the carboxylic acid monomer is acrylic acid, methacrylic acid, or crotonic acid.

3. A composition as claimed in claim 1, wherein the sulfonic acid monomer or the sulfonate monomer is 2-acrylamide-2methylpropanesulfonic acid acid, sodium 2-methacryloyloxyethanesulfonate or sodium to 3-methacryloyloxypropanesulfonate 4. A composition as claimed in claim 1, wherein the inorganic substance is at least one substance selected from the group consisting of calcium sulfite, calcium sulfate, barium sulfate, silicon dioxide, quartz, calcite, feldspar, titanium oxide, antimony trioxide, talc, clay, aluminum oxide, calcium carbonate, nickel powder, iron powder, zinc powder, copper powder, iron oxide, zinc oxide, aluminum hydroxide, magnesium hydroxide, glass powder, glass beads, glass fibers, barium salt- or lead salt-containing glass filler, silica gel, zirconium oxide, tin oxide, and gypsum.

5. A composition as claimed in claim 1, wherein the vinyl compound is methyl methacrylate or a mixture or partial polymer composed of 80 to 100 wt % of methyl methacrylate and 0 to 20 wt % of copolymerizable vinyl compound.

6. A composition as claimed in claim 1, wherein . the amount of the inorganic substance based on the total weight of composition is 20 to 95 wt %.

7. A composition as claimed in claim 1, wherein the amount of the carboxylic acid monomer, sulfonic acid monomer, or sulfonate monomer used for the production of the organic substance-bound filler is 0.05 to 100 wt % based on the total amount of the inorganic substance and vinyl monomer.

8. A composition an claimed in claim 1, wherein the weight ratio of the vinyl monomer to the inorganic substance in the production of the organic substance-bound filler is 250:1 to 1:5.

9. A composition as claimed in claim 1, wherein the amount of the organic polymer bound to the inorganic substance in the polymer composition is 0.01 to 100 wt %.

10. A process for producing an artificial marble which comprises casting and polymerizing a composition comprising a polymer composition, in which an inorganic substance and an organic polymer are firmly bound in one body, a vinyl compound comprising methyl methacrylate, and a polymerization initiator, said polymer composition having been obtained by heterogeneously polymerizing methyl methacrylate or a mixture of methyl methacrylate and other vinyl monomer susceptible to radical polymerization, in the presence of at least one monomer selected from the group consisting of carboxylic acid monomers represented by the general formula (I):

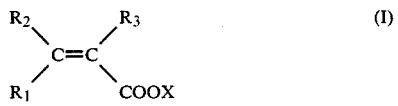

wherein $R_1$ and $R_2$ are H, $C_1$-$C_{15}$ alkyl group, COOY where Y is H, $NH_4$, or alkali metal atom halogen atom, phenyl group, or substituted phenyl group; $R_3$ is H, $C_1$-$C_{15}$ alkyl group, halogen atom, phenyl group, or substituted phenyl group; and X is H, $NH_4$, or alkali metal atom or by the general formula (II):

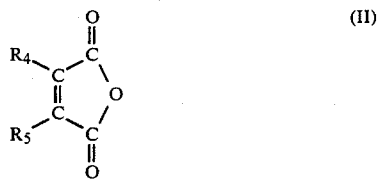

wherein $R_4$ and $R_5$ are H, $C_1$-$C_{15}$ alkyl group, halogen atom, phenyl group, or substituted phenyl group, and sulfonic acid monomers or sulfonate monomers represented by the general formula (III):

wherein $R'_1$ is H, $C_1$-$C_{20}$ alkyl group, phenyl group, substituted phenyl group, or halogen atom; X' is CONH,

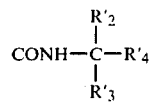

where $R'_2$ and $R'_3$ are H or $C_1$-$C_{15}$ alkyl group, and $R'_4$ is $C_1$-$C_{15}$ alkylene group, COO $(CH_2)_m$ where m is an integer of 1 to 20, or $(CH_2)_n$ where n is an integer of 0 to 20; and Y is H, $NH_4$, or alkali metal atom, in an aqueous polymerization system containing the inorganic substance dispersed therein, said process further comprising incorporating in the composition 0.01 to 10 wt. % based on the total weight of the composition of at least one of silane, titanate, aluminate and zircoaluminate coupling agents.

11. A process as claimed in claim 10, wherein the carboxylic acid monomer is acrylic acid, methacrylic acid, or crotonic acid.

12. A process as claimed in claim 10, wherein the sulfonic acid monomer or sulfonate monomer is 2-acrylamide-2-methylpropanesulfonic acid, sodium 2-methacryloyloxyethanesulfonate or sodium 3-methacryloyloxypropanesulfonate.

13. A process as claimed in claim 10, wherein the inorganic substance is at least one substance selected from the group consisting of calcium sulfite, calcium sulfate, barium sulfate, silicon dioxide, quartz, calcite, feldspar, titanium oxide, antimony trioxide, talc, clay, aluminum oxide, calcium carbonate, nickel powder, iron powder, zinc powder, copper powder, iron oxide, zinc oxide, aluminum hydroxide, magnesium hydroxide, glass powder, glass beads, glass fibers, barium salt- or lead salt-containing glass filler, silica gel, zirconium oxide, tin oxide, and gypsum.

14. A process as claimed in claim 10, wherein the vinyl compound is methyl methacrylate or a mixture or partial polymer composed of 80 to 100 wt % of methyl methacrylate and 0 to 20 wt % of copolymerizable vinyl compound.

15. A process as claimed in claim 10, wherein the amount of the inorganic substance is 20 to 95wt % based on the total weight of the composition.

16. A process as claimed in claim 10, wherein the amount of the carboxylic acid monomer, sulfonic acid monomer, or sulfonate monomer in the production of the organic substancebound filler is 0.05 to 100 wt % based on the total weight of the inorganic substance and vinyl monomer.

17. A process as claimed in claim 10, wherein the weight ratio of the vinyl monomer to the inorganic substance in the production of the organic substance-bound filler is 250:1 to 1:5.

18. A process as claimed in claim 10, wherein the amount of the organic polymer bound to the inorganic substance in the polymer composition is 0.01 to 100 wt %.

19. A process as claimed in claim 10, wherein the amount used of the polymerization initiator is 0.01 to 10 wt % based on the amount of the vinyl compound.

* * * * *